(12) United States Patent
Wessner et al.

(10) Patent No.: US 7,637,115 B2
(45) Date of Patent: Dec. 29, 2009

(54) EXPANSION DEVICE FOR AN AIR CONDITIONING SYSTEM

(75) Inventors: Jochen Wessner, Esslingen (DE); Peter Horstmann, Leonberg (DE); Peter Satzger, Landsberg (DE); Tilman Miehle, Waiblingen (DE); Martin Reif, Rheinfelden (DE)

(73) Assignee: Robert Bosch GmbH, Stuttgart (DE)

( * ) Notice: Subject to any disclaimer, the term of this patent is extended or adjusted under 35 U.S.C. 154(b) by 454 days.

(21) Appl. No.: 10/545,045

(22) PCT Filed: Nov. 6, 2003

(86) PCT No.: PCT/DE03/03687

§ 371 (c)(1),
(2), (4) Date: Aug. 11, 2005

(87) PCT Pub. No.: WO2004/072566

PCT Pub. Date: Aug. 26, 2004

(65) Prior Publication Data

US 2006/0179877 A1    Aug. 17, 2006

(30) Foreign Application Priority Data

Feb. 12, 2003   (DE) ............................. 103 05 947

(51) Int. Cl.
*F25B 41/04* (2006.01)

(52) U.S. Cl. .......................................... 62/222; 62/511

(58) Field of Classification Search ................. 62/222, 62/527, 511
See application file for complete search history.

(56) References Cited

U.S. PATENT DOCUMENTS

| | | | |
|---|---|---|---|
| 5,588,590 A * | 12/1996 | Sakakibara et al. | ........ 236/92 B |
| 6,418,737 B1 | 7/2002 | Kuroki et al. | |
| 2005/0056034 A1* | 3/2005 | Hirota | ........................ 62/222 |

FOREIGN PATENT DOCUMENTS

| | | |
|---|---|---|
| DE | 198 53 103 | 5/2000 |
| DE | 199 56 830 | 6/2001 |
| DE | 100 23 621 | 11/2001 |
| EP | 0 992 727 | 4/2000 |

\* cited by examiner

*Primary Examiner*—Melvin Jones
(74) *Attorney, Agent, or Firm*—Michael Best & Friedrich LLP

(57) ABSTRACT

The invention relates to an expansion device for a refrigerant, in particular an expansion device to control the high-pressure level of an air conditioner. In accordance with the invention, it is provided that the expansion device (16) is a sliding seat valve (22). In addition, the invention relates to an air conditioner (10), in particular an air conditioner (10) for a motor vehicle, with a compressor (12), a condenser or gas cooler (14), an expansion device (16) as well as an evaporator (18). In accordance with the invention, it is proposed that the expansion device (16) is formed by at least one sliding seat valve (22).

23 Claims, 3 Drawing Sheets

EXPANSION DEVICE FOR AN AIR CONDITIONING SYSTEM

BACKGROUND ON THE INVENTION

The present invention relates to an expansion device for an air conditioner, in particular for an air conditioner of a motor vehicle. In addition, the present invention relates to this type of air conditioner.

In the case of air conditioners, particularly compression air conditioners, a compression of a refrigerant is first performed via a compressor, the so-called air conditioner compressor or a simple compressor, in order to increase the internal energy of the refrigerant. The compressed refrigerant is then cooled in a condenser or liquefier via heat exchange. The refrigerant liquefies in the process due to the heat emission that goes hand in hand with the heat exchange. Then the liquefied refrigerant is guided through a throttling point of the air conditioner, whereby this throttling point features an expansion device. The refrigerant expands when it passes through the expansion device. As a rule, an evaporator is subsequently connected to the expansion device and it is operated as a heat exchanger in order to transfer the cold that is being released onto another medium. This other medium can, e.g., be air, which is supplied to a vehicle heating or cooling system.

In order to improve the thermal efficiency of an air conditioner, it is known from the prior air to bring the refrigerant located in the condenser to a super-critical state on the high-pressure side of the closed refrigerant cycle in order to thereby improve the heat exchange performance of the air conditioner. The condenser is then designated as a gas cooler since condensation no longer occurs, but only a cooling of the super-critical gas. In addition, super-critically operated compressor refrigerating machines make it possible for a refrigerant (e.g., carbon dioxide) with a smaller compression ratio to be used.

Due to the control of throttling on the expansion device of the refrigerant cycle, the pressure on the high-pressure side of the thermodynamic cycle process can be controlled or regulated so that the specific cooling performance of the air conditioner can be thereby varied. Thus, it is possible to obtain a maximum effective performance number by setting the pressure of the high-pressure side of the thermodynamic refrigerant cycle in an adapted manner as a function of the temperature at the gas cooler outlet or the ambient temperature.

Particularly in the case of refrigerating systems with refrigerants, which emit heat in the super-critical range due to their thermodynamic properties, the pressure during heat emission can be set independent of the temperature. Using controllable and/or regulatable expansion valves as expansion devices is known in order to be able to advantageously utilize this additional degree of freedom (as opposed to refrigerants with heat emission in the moist vapor range). Currently, both purely mechanical as well as electrically driven expansion valves are being developed, whereby each of these developments of a new expansion devices for a refrigerant cycle of an air conditioner is associated with high costs.

In the case of air conditioners with condensation, overheating of the refrigerant from the evaporator can be controlled via controlling the throttling at the expansion device of the refrigerant cycle in such a way that the cold performance is optimal.

Expansion valves are designed predominantly as valves with a ball seat and an electromagnetic drive. These valves are disadvantageous because of extreme noise development in certain operating states. Particularly in the case of low volume flows of the refrigerant and therefore in the case of valves that are almost closed, it is possible for the valve ball to impact the seat, thereby leading to the distinct development of noise. For this reason, regulating pressure via the expansion device with valves of the ball-seat type is problematic since these go hand in hand with the previously described development of noise.

Valves with sliding seats that have low-noise operation are also known from the field of fuel injection. The disadvantage of this type of valve is the poor imperviousness of the completely closed valve. Because of the function-induced gap between the slider (piston) and the valve seat (guide), when there is a great pressure difference such as that that inevitably occurs in air conditioners particularly with the refrigerant $CO_2$, there is a refrigerant volume flow that is too great for operating a refrigerating system. In particular, because of this leakage, sufficiently great pressure cannot be built up at low pressures in order to be able to operate the air conditioner in a favorable state (efficiency/performance). For this reason, sliding seat valves appear to be unusable as an expansion device for an air conditioning cycle.

The objective on which the invention is based is providing an expansion valve for a refrigerant cycle, which guarantees good controllability with low-noise operation in all operating states of the air conditioner.

In addition, the invention is based on realizing an air conditioner, in particular an air conditioner for a motor vehicle, which makes an improvement in the thermal efficiency of the air conditioner possible through the use of the controllable and/or regulatable expansion valves.

SUMMARY OF THE INVENTION

By embodying the expansion device in accordance with the invention as an electromagnetic sliding seat valve, it is possible to advantageously realize an expansion valve, which makes good controllability possible with overall low-noise operation in all operating states.

The use of the expansion device in accordance with the invention in an air conditioner advantageously enables the thermal efficiency of an air conditioner to be improved without the high costs required to develop a new expansion device.

The features listed in the sub-claims disclose advantageous developments of the expansion device in accordance with the invention and the air conditioner in accordance with the invention.

By modifying the gap geometry of a conventional sliding seat valve, the imperviousness of this type of valve can be clearly improved. In particular, by lengthening the valve piston, the gap geometry between the valve piston (slider element) and the piston guide (seat of the slider) of the sliding seat valve can be optimized. This type of modification first of all makes it possible to use a sliding seat valve as an expansion device in an air conditioner.

A gap height between the valve piston (slider element) and piston guidance (seat of the slider), which is less than 15 µm, or a gap height, which is less than 8 µm, has proven to be especially advantageous for the applicability of the sliding seat valve as an expansion device in an air conditioning cycle.

Gap geometry with a gap length between the valve piston (slider element) and piston guidance (seat of the slider) in the range of 0.1 to 5 mm, particularly a gap length that is preferably in the range of 1 to 2 mm, has proven to be especially advantageous.

According to an advantageous embodiment of the expansion device in accordance with the invention, the sliding seat valve has at least one valve piston and a magnet armature to move the valve piston, wherein the valve piston and/or the magnet armature have at least one bore hole and/or at least one channel, which guarantees that the pressure in the area of the valve piston and the magnet armature is approximately equally great. In this way, pressure compensation on the entire low-pressure side is achieved. Thus, the pressure difference applies only in the area of the supply channel for the valve. As a result, practically no pressure forces occur, rather only low frictional forces during the movement of the valve piston of the expansion device in accordance with the invention.

The valve piston of the expansion device in accordance with the invention advantageously has at least one throttle opening, whose overall surface is in the range of approx. 1 to 7 mm$^2$. Contours have turned out to be especially advantageous for the throttle openings, which are stepped or slotted trapezoidally in the direction of the valve axis. Because of the different contours of the throttle slot(s), the relationship of the axial path of the valve piston to the opening of the throttle cross section and thus the valve characteristic can be adapted to the individual application requirements of the air conditioner.

Depending upon the desired embodiment, it is possible to advantageously achieve a positioning of the throttle slot(s) in the valve piston of the expansion device in accordance with the invention such that the valve can either be opened or else even closed in a de-energized state.

In particular, in the case of special exemplary embodiments of the valve in accordance with the invention, two or more throttle openings can be positioned in such a way that the force acting on the cylinder surface of the valve piston is null.

The frictional forces within the valve and thus also the force to be applied by a valve actuator to activate the valve can be advantageously reduced in that, e.g., the valve piston, the tappet, the magnet armature or even the piston guide of the valve are coated to be low in friction. In particular, a Teflon or carbon coating is advantageous because of the low interaction with the refrigerant.

An expansion device in the form of a sliding seat valve of the type "Bosch ZME (metering unit) No. 0928400 XXX" has proven to be especially advantageous. In this case, XXX designates the plug variation as well as the size and contour of the throttle opening. These types of pressure control valves are provided to control the supply to a high-pressure pump of a fuel injection system for example. Using a magnetic valve already known in principle from another field of technology as an expansion device of an air conditioner leads to a clear reduction in the development and manufacturing costs of both the expansion device as well as the entire air conditioner. Although the valve is normally operated in injection systems with a pressure of approx. 10 bar, it has turned out that it can also be used reliably without additional problems in the clearly higher pressure range of a $CO_2$ refrigerating system of approx. 150 bar for example.

In an advantageous exemplary embodiment of the expansion device in accordance with the invention, the internal seals of the valve "Bosch ZME (metering unit) 0928400 XXX" are replaced by a sealing sheath welded onto the magnet core of the valve. This leads advantageously to the valve being impervious to the outside by means of the welded-on sheath. The material for this sealing sheath is selected in such a way that a negative interaction, e.g., of the $CO_2$ refrigerant with the material of the sealing sheath, is avoided.

The expansion device in accordance with the invention has a plug element via which a triggering signal for operating the valve can be supplied. A pulse-width modulated signal with a frequency in the range of 100 to 800 Hz can be used as the triggering signal. The expansion device in accordance with the invention can be operated with a triggering signal preferably in the range of 250 to 400 Hz. This advantageous triggering frequency of the expansion device lies above the frequencies used for direct fuel injection. Because of this measure, among other things, vibrations in the system, such as the "rocking" of the expansion valve, are avoided for example. A further reduction of vibrations can be advantageously achieved via a modulation of the pulse-width repetition rate of the pulse-width modulated signal with a lower frequency than the frequency of pulse-width modulation, preferably with frequencies between 10 and 100 Hz.

The expansion device can be realized by the connection in parallel of several metering unit valves such that the controllable volume flow of the air conditioner in accordance with the invention is increased.

Adapting and modifying a pressure control magnetic valve already known in principle from another field of technology as an expansion device of an air conditioner clearly reduces the development and manufacturing costs for such a valve. A valve technology for air conditioners was found, which makes it possible to provide an expansion valve for the refrigerant cycle of the air conditioner, which guarantees good controllability and low-noise operation in all operating states, while at the same time guaranteeing sufficient imperviousness of the completely closed valve.

Using such a valve in an air conditioner produces a clear improvement in the thermal efficiency of the air conditioner.

Additional advantages and features of the expansion device in accordance with the invention or the air conditioner in accordance with the invention are yielded from the following description of an exemplary embodiment.

BRIEF DESCRIPTION OF THE DRAWINGS

An exemplary embodiment of the expansion device in accordance with the invention as well as a refrigerant cycle in accordance with the invention that uses such an expansion device are depicted in the drawings; these shall be explained in greater detail in the following description. The figures in the drawing, the description thereof as well as the claims contain numerous features in combination. A person skilled in the art will also observe these features individually and combine them into additional, meaningful combinations.

The drawings show.

DETAILED DESCRIPTION

Figure 1:
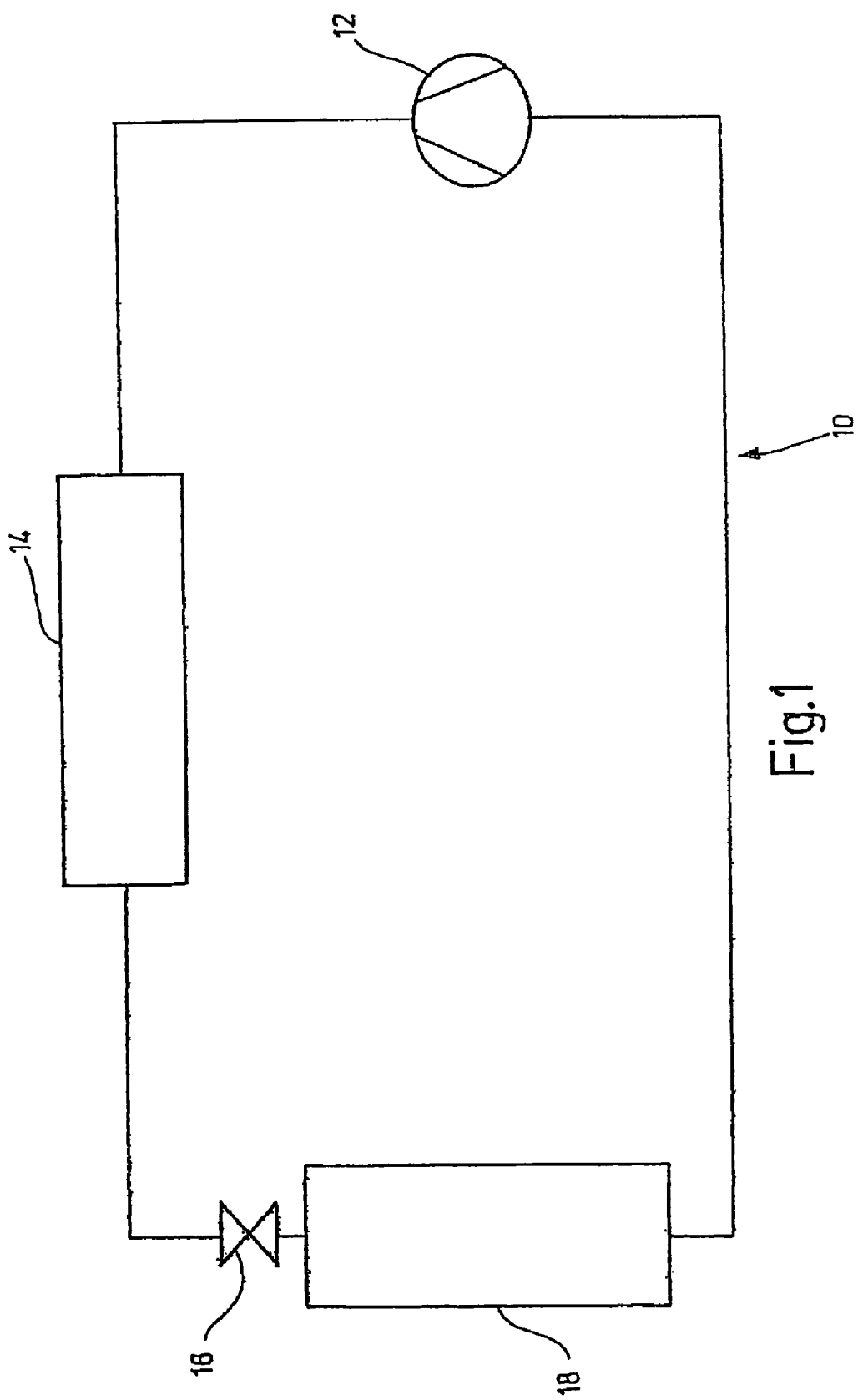
FIG. 1 A schematic depiction of an exemplary embodiment of an air conditioner in accordance with the invention.

The air conditioner 10 depicted in principle in FIG. 1 includes a compressor 12, a condenser or gas cooler 14, an expansion device 16 and an evaporator 18, which are connected with one another via corresponding connecting means 20 and form a refrigerant cycle.

The components of this cycle are operated in accordance with a type of compression refrigerant cycle, as was explained at the outset. The embodiment of an air conditioner in accordance with the invention that is depicted in FIG. 1 differs from the prior art in that the expansion device 16 is formed by at least one sliding seat valve, in particular a metering unit valve of the type "Bosch ZME (metering unit) No. 0928400 XXX." This type of magnetic valve is normally used in connection with direct fuel injection. In this case, XXX of the type coding of this valve designates the plug variation as well as the size and contour of the throttle opening, which can vary due to the different applications.

Figure 2:
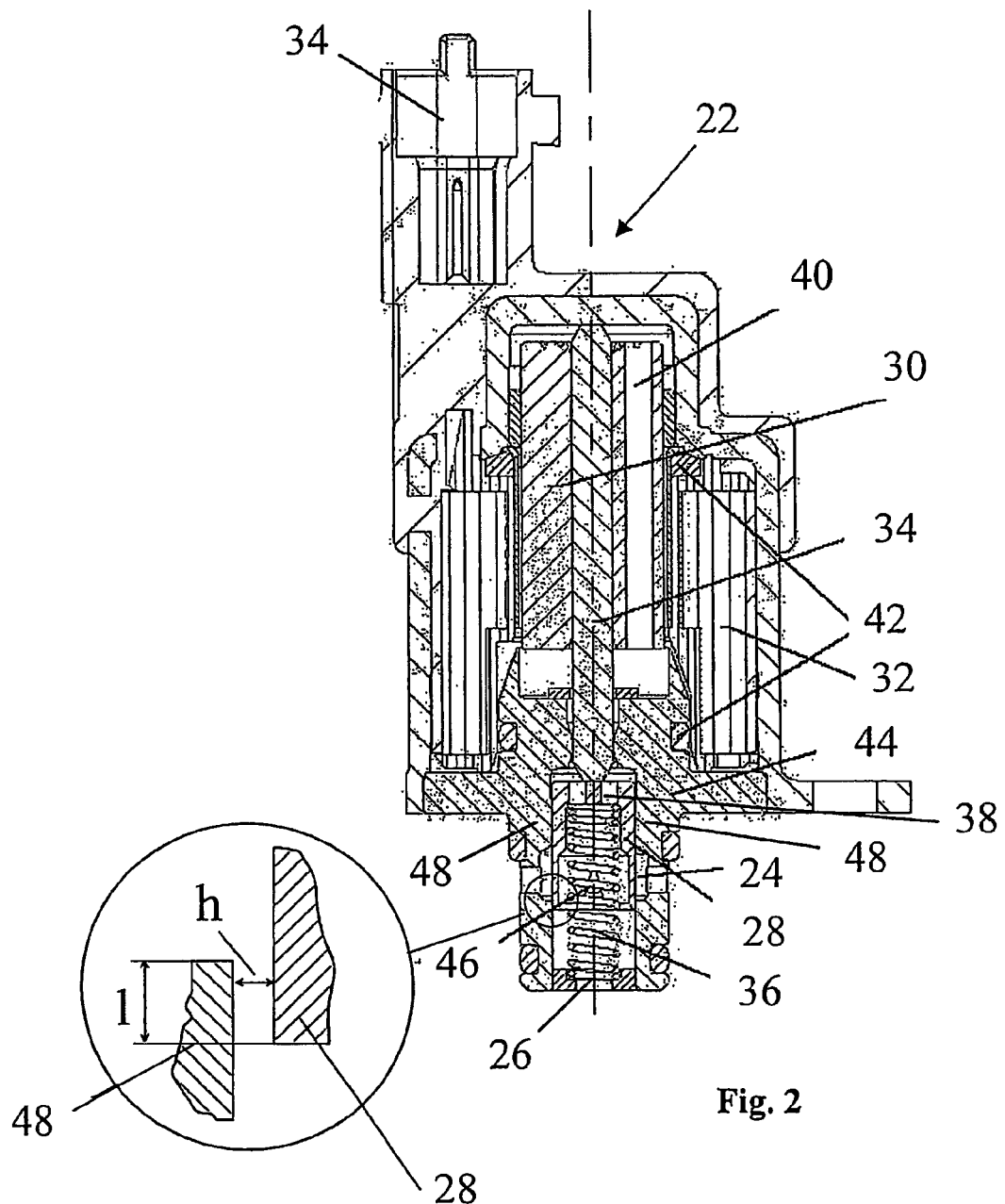
FIG. 2 A longitudinal section of an exemplary embodiment of an expansion device in accordance with the invention.

FIG. 2 shows the cross section through an expansion device in accordance with the invention, the principle structure of which is supposed to be explained in the following.

The valve 22, which is being used as an expansion device 16 in an air conditioner, e.g., in accordance with FIG. 1, is used to regulate the high pressure in an air conditioner, in particular a $CO_2$ refrigerating system. This occurs in that the refrigerant in the expansion device 16 or 22 is throttled in a targeted manner to a low pressure (expansion). The expansion device 22 in accordance with the invention has a supply channel 24 as well as a discharge channel 26, whose connection can be opened or closed in a desired manner via a valve piston 28.

The valve 22 has a magnet armature 30 to activate the valve piston 28, which is driven by an external magnetic coil 32. The magnetic coil 32 is acted upon by a corresponding triggering signal via a plug element 34. The triggering signal for operating the valve in accordance with the invention is a pulse-width modulated or analog signal with a frequency of typically 100 to 800 Hz. The expansion device in accordance with the invention is preferably operated in a frequency of 250 to 400 Hz.

The magnet armature 30 acts on the valve piston 28 via a tappet 34. A spring 36 acts against the magnetic force of this actuator so that in the case of targeted energizing of the magnetic coil 32, any given position of the valve piston 28 can be adjusted via an equilibrium of forces between essentially the spring force of the spring 36 and the magnetic force on the magnet armature 30.

Only very low-pressure forces act on the valve piston 28 or the magnet armature 30 since both (valve piston and the magnet armature) have channels and/or bore holes 38 and 40. These channels or bore holes provide for pressure compensation on the entire low-pressure side of the valve. The pressure difference via the valve therefore applies only on the cylinder surface of the valve piston 28 in the area of the supply channel 24. As a result, only low frictional forces occur during the movement of the valve piston 28.

The area of the valve 22 acted upon by the refrigerating medium is sealed vis-à-vis the environment via seals 42. The seals, which are embodied in the form of O-rings for example, are composed advantageously of a material, which is suitable for contact with the refrigerant. When using $CO_2$ as a refrigerant, Teflon is a suitable material for the O-rings. Negative interactions of the $CO_2$ refrigerant with the sealing elements should be avoided since otherwise this could result in a destruction of the sealing elements due to explosive decompression from the refrigerant diffusing into the material for example.

As a result, it is equally advantageous for the same reason to embody the bearing for guiding the valve armature of a material that will not interact with the refrigerant. A greater imperviousness of the valve to the outside can also be achieved for example via a continuous sheath, which surrounds the magnet armature 30 and is welded, soldered or otherwise connected to the magnet core 44 of the valve.

The valve 22 in accordance with the invention is used to allow the high pressure in an air conditioning system 10 to expand in a defined manner to a low pressure. This throttling takes place in one or more throttle slots 46, which are incorporated into the cylinder surface of the valve piston 28 of the valve 22.

Figure 3:
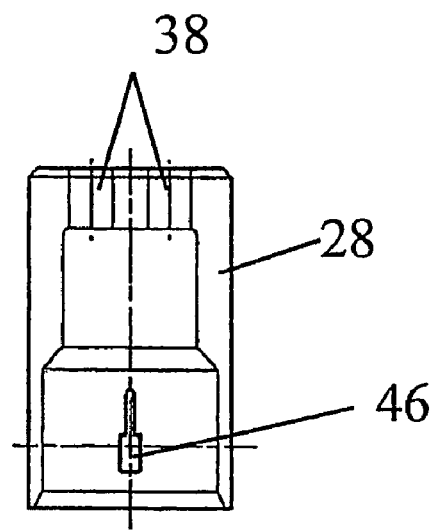
FIG. 3 A schematic depiction of a first exemplary embodiment of a valve piston of an expansion device in accordance with the invention.
Figure 4:
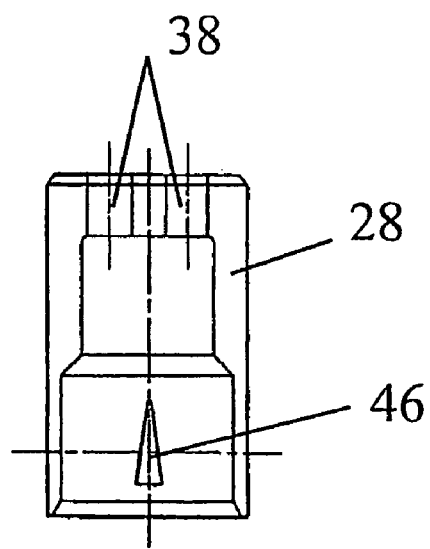
FIG. 4 A schematic depiction of a second exemplary embodiment of a valve piston of an expansion device in accordance with the invention.

FIG. 3 and FIG. 4 depict two exemplary embodiments of throttle slots 46. For reasons of clarity, only one throttle slot is depicted for each valve piston 28. Of course, it is possible in other exemplary embodiments to embody any number of correspondingly formed throttle slots 46 in the cylinder shape of the valve piston 28. The typical throttle cross-sectional surface in this case should be in a range of approx. 1 to 7 $mm^2$. FIG. 3 shows the example of a stepped throttle slot, while the throttle slot in accordance with FIG. 4 features a trapezoidal contour. Other contours for the throttle slots 46 are naturally also possible. Thus, for example, the contour of the at least one throttle slot can expand continuously more or less strongly concave or convex in the axial direction against a trapezoidal expansion.

Because of the axial movement of the valve piston 28 in the guide 48, which is embodied in the lower portion of the magnet core 44 of the valve 22, there is flow through only a portion of the throttle slot(s) 46 depending upon the setting of the valve piston 28 relative to the supply channel 24, and throttling power is thereby varied. A suitable positioning of the throttle slots 46 in the valve piston 28 also permits the valve 22 in accordance with the invention to be either opened or closed when it is switched to be de-energized.

In the case of a given volume flow through the valve 22, the pressure difference over the throttle slot 46 increases with a reduction in the throttle cross section. By changing the throttle cross section, the pressure at the entrance to the expansion valve 16 or 22 (high pressure of the refrigerating system) can therefore be adjusted in a targeted manner. In just the same way, with a changing volume flow of the high-pressure refrigerating system 10, desired values can be set by adjusting the contour of the throttle cross section 46.

Because of the different contours of the throttle slots 46, as they are depicted in FIG. 3 and FIG. 4 for example, the relationship of the axial path of the valve piston 28 to the opening of the throttle cross section and thus the valve characteristic of the expansion device in accordance with the invention can be varied.

Figure 5:
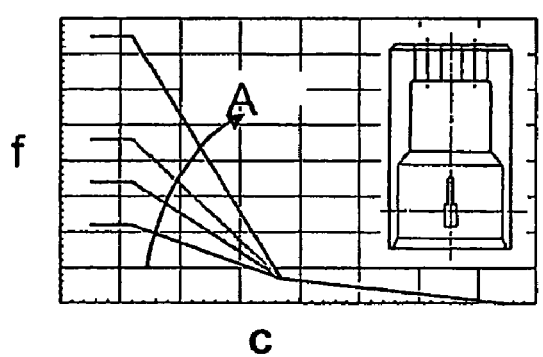
FIG. 5 A schematic depiction of the flow characteristic for the valve piston of an expansion device of the first exemplary embodiment.
Figure 6:
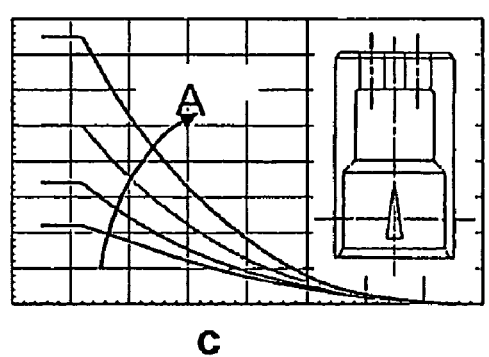
FIG. 6 A schematic depiction of the flow characteristic for the second exemplary embodiment of a valve piston.

FIGS. 5 and 6 each show a schematic depiction of the valve characteristic of the expansion device in accordance with the invention when using a valve piston 28 with throttle cross-sectional contours in accordance with FIG. 3 and FIG. 4. For reasons of clarity, the valve pistons 28 in accordance with FIG. 3 and FIG. 4 are depicted again in the valve characteristic. The x-axis in the graphic representations as per FIG. 5 and FIG. 6 corresponds to the stroke of the valve piston 28 and is therefore a function of the current c applied to the expansion device. Flow f is entered on the y-axis, which essentially corresponds to the throttle cross section at the respective stroke setting of the valve piston. The individual curves reproduce the valve characteristics at different overall throttle cross sections A, whereby the sketched-in arrow indicates the direction of increasing throttle cross sections A. The typical throttle cross section A in this case is in a range of approx. 1 to 7 $mm^2$.

An optimized valve characteristic for the air conditioning cycle 10 can be realized with the aid of the special throttle cross-sectional shape, the triggering signal to be applied to the expansion device 22 as well as the spring characteristic of the counter spring 36. If one uses a pulse-width modulated signal or a signal that is otherwise regulated in terms of voltage or current to trigger the magnet coil 32, the valve 22 in accordance with the invention can be regulated or controlled by regulating or controlling the volume flow of the refrigerant or the high pressure of the refrigerant.

A completely closed sliding seat valve typically features an internal leakage, which is a function of the pressure difference over the valve and the gaps between the valve piston 28 and the valve guide 48. FIG. 2 also shows an enlarged detailed representation of a section of the gap geometry between the valve piston 28 and the valve guide 48. In order to achieve high imperviousness of the completely closed expansion device and therefore to have the possibility in principle of still being able to adjust a defined high pressure even with the smallest volume flows, the gap height h or the gap length l between the valve piston 28 (slider) and the piston guide 48 (seat of the slider) in the expansion device in accordance with the invention are modified in such a way that a presettable adequate imperviousness of the completely closed expansion device is guaranteed.

This can be achieved, e.g., via a suitable selection of the gap geometry (height h to length l), e.g., via reducing the gap height h and/or lengthening length l of the gap. For example, the valve piston 28 of a valve of type "Bosch ZME (metering unit) No. 0928400 XXX" can be lengthened in order to achieve a corresponding lengthening of the guide gap. On the other hand, a corresponding selection the tolerances in the case of Bosch valves No. 0928400 XXX allows a valve to be selected, which meets the high requirements that are placed on an expansion device for an air conditioner.

One possibility of reducing the tolerances in an advantageous manner is to coat the valve piston (28) and/or the piston guide to be low in friction such as with a Teflon or carbon coating for example.

The expansion device in accordance with the invention is not limited to the exemplary embodiment presented in the description. In addition, the expansion device in accordance with the invention is not limited to the use in the described refrigerant cycle of an air conditioner. In particular, the air conditioner in accordance with the invention is not limited to the use of $CO_2$ as a refrigerant.

In addition, the air conditioner in accordance with the invention is not limited to the use only of a valve as an expansion device. It is possible in an advantageous manner for the expansion device 16 of the air conditioner in accordance with the invention to have several metering unit valves 22, which are connected to one another in parallel.

In addition, it is possible in principle to also operate the air conditioner 10 in accordance with the invention as a heat pump. The additional components that are required for the reversal of the cycle process are known from the prior art and need no further mention.

The invention claimed is:

1. Expansion device (16) for a refrigerant, in particular an expansion device (16) to control a high pressure of an air conditioner (10), characterized in that the expansion device (16) is embodied in the form of a sliding seat valve (22) and in that the valve piston (28) of the valve (22) features at least one throttle opening (46) such that the throttle opening (46) in the valve piston (28) has an overall opening surface in the range of approx. 1 to 7 $mm^2$.

2. Expansion device according to claim 1, characterized in that gap geometry between the valve piston (28) and a piston guide (48) of the sliding seat valve (22) is selected in such a way that the valve (22) features a presettable imperviousness in a closed state.

3. Expansion device according to claim 1, characterized in that gap geometry is such that a gap height (h) is less than 15 micrometers, preferably less than 8 micrometers.

4. Expansion device according to claim 1, characterized in that gap geometry is such that a gap length (l) lies in a range between 0.1 mm and 5 mm, preferably in a range between 1 and 2 mm.

5. Expansion device according to claim 1, characterized in that the throttle opening (46) is essentially slot-shaped and essentially runs in the axial direction in the cylinder jacket of the valve piston (28).

6. Expansion device according to claim 1, characterized in that the contour of the at least one throttle slot (46) expands spasmodically in the axial direction at least at one location.

7. Expansion device according to claim 1, characterized in that the contour of the at least one throttle slot (46) continuously expands trapezoidally in the axial direction.

8. Expansion device according to claim 1, characterized in that the contour of the at least one throttle slot (46) expands continuously more or less strongly concave or convex in the axial direction against a trapezoidal expansion.

9. Expansion device according to claim 1, characterized in that the at least one throttle opening (46) is positioned in the valve piston (28) of the valve (22) in such a way that the valve (22) is opened in a de-energized state.

10. Expansion device according to claim 1, characterized in that the at least one throttle opening (46) is positioned in the valve piston (28) of the valve (22) in such a way that the valve (22) is closed in a de-energized state.

11. Expansion device according to claim 1, characterized in that two or more throttle openings are positioned in such a way that the force acting on the cylinder surface of the valve piston (28) is null.

12. Expansion device (16) for controlling a high pressure of a refrigerant in an air-conditioning system (10), with the expansion device (16) being designed in the manner of a sliding seat valve (22) with at least one valve piston (28) and a magnet armature (30) for moving the valve piston (28), with the valve piston (28) having at least one substantially slot-shaped throttle opening (46) which runs in the axial direction in the cylinder casing of the valve piston (28), characterized in that the at least one throttle opening (46) has an overall opening area in the region of approximately 1 to 7 $mm^2$ and in that the gap geometry between the valve piston (28) and a piston guide (48) of the sliding seat valve (22) is selected, in order to obtain a presettable imperviousness in a closed state, such that a gap height (h) is less than 15 micrometers, preferably less than 8 micrometers, and a gap length (l) lies in the range between 0.1 and 5 mm, preferably in the range between 1 and 2 mm.

13. Expansion device according to claim 12, characterized in that the sliding seat valve (22) features at least one valve piston (28) and a magnet armature (30) to move the valve piston (28), wherein the valve piston (28) and/or the magnet armature (30) have at least one bore hole (40) and/or at least one channel (38), which guarantees that the pressure in the area of the valve piston (28) and the magnet armature (30) is approximately equally great.

14. Expansion device according to claim 13, characterized in that the at least one bore hole (40) or the at least one channel (48) essentially runs in the axial direction of the magnet armature (30).

15. Expansion device according to claim 12, characterized in that at least one element of a group of elements, which includes, among others, the valve piston (28), the tappet (34), the magnet armature (30) and/or the piston guide (48), is coated to be low in friction, in particular provided preferably with a Teflon or carbon coating.

16. Expansion device according to claim 12, characterized in that the valve (22) is a "Bosch ZME (metering unit) No. 0 928 400 xxx" type valve.

17. Expansion device according to claim 16, characterized in that the internal seals (42) of the "Bosch ZME (metering unit) No. 0 928 400 xxx" type valve are at least partially replaced by a sealing sheath applied to the magnet core (44) of the valve.

18. Expansion device according to claim 17, characterized in that the sheath is applied in such a way that the valve (22) is impervious to the outside.

19. Expansion device according to claim 12, characterized in that a triggering signal for operating the valve (22) is essentially a pulse-width modulated signal with a frequency in the range of 100 to 800 Hz, preferably in the range of 250 to 400 Hz.

20. Expansion device according to claim 19, characterized in that the pulse-width repetition rate of the pulse-width modulated signal is modulated with a lower frequency than the pulse-width modulation itself, preferably with a frequency between 10 and 100 Hz.

21. Air conditioner, in particular an air conditioner for a motor vehicle, with at least one compressor (12), a condenser or gas cooler (14), an expansion device (16) and an evaporator (18), which are connected in a suitable manner via connecting means (20), characterized in that the expansion device (16) is formed by at least one sliding seat valve (22) and in that gap geometry between a valve piston (28) and a piston guide (48) of the sliding seat valve (22) is such that a gap length (l) lies in a range between 0.1 mm and 5 mm.

22. Air conditioner according to claim 21, characterized in that the refrigerant of the air conditioner is $CO_2$.

23. A method of air conditioning a motor vehicle, the method comprising using at least one "Bosch ZME (metering unit) No. 0 928 400 xxx" sliding seat valve, in which a gap geometry between a valve piston and a piston guide of the sliding seat valve is reduced, as an expansion device of a $CO_2$ air conditioner, in the motor vehicle.

* * * * *

UNITED STATES PATENT AND TRADEMARK OFFICE
CERTIFICATE OF CORRECTION

PATENT NO. : 7,637,115 B2
APPLICATION NO. : 10/545045
DATED : December 29, 2009
INVENTOR(S) : Wessner et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 802 days.

Signed and Sealed this

Ninth Day of November, 2010

David J. Kappos
*Director of the United States Patent and Trademark Office*